(12) United States Patent
Chang et al.

(10) Patent No.: US 12,407,252 B2
(45) Date of Patent: Sep. 2, 2025

(54) SWITCHING REGULATOR AND OPERATION CLOCK SIGNAL GENERATOR CIRCUIT AND CONTROL METHOD THEREOF

(71) Applicant: Richtek Technology Corporation, Hsinchu (TW)

(72) Inventors: Chia-Jung Chang, Hsinchu (TW); Shao-Ming Chang, Keelung (TW); Tsan-He Wang, New Taipei (TW); Jiing-Horng Wang, Hsinchu (TW); Yu-Pin Tseng, Miaoli (TW)

(73) Assignee: Richtek Technology Corporation, Hsinchu (TW)

( * ) Notice: Subject to any disclaimer, the term of this patent is extended or adjusted under 35 U.S.C. 154(b) by 202 days.

(21) Appl. No.: 18/471,331

(22) Filed: Sep. 21, 2023

(65) Prior Publication Data

US 2024/0128868 A1 Apr. 18, 2024

(30) Foreign Application Priority Data

Oct. 14, 2022 (TW) .................................. 111139087

(51) Int. Cl.
*H02M 3/157* (2006.01)
*H02M 3/158* (2006.01)
(52) U.S. Cl.
CPC ........... *H02M 3/157* (2013.01); *H02M 3/158* (2013.01)

(58) Field of Classification Search
CPC ..... H02M 3/157; H02M 3/158; H02M 1/0032
See application file for complete search history.

(56) References Cited

U.S. PATENT DOCUMENTS

| | | | |
|---|---|---|---|
| 5,886,504 A * | 3/1999 | Scott | H02K 7/1815 322/15 |
| 2004/0095117 A1 * | 5/2004 | Kernahan | H02M 3/156 323/282 |
| 2015/0280567 A1 * | 10/2015 | Fukumoto | H02M 3/156 323/271 |

* cited by examiner

*Primary Examiner* — Adolf D Berhane
*Assistant Examiner* — Afework S Demisse
(74) *Attorney, Agent, or Firm* — Huan-Yi Lin (57) ABSTRACT

A switching regulator includes: a power stage circuit; a control circuit; and an operation clock signal generator circuit configured to generate plural test clock signals during a clock determination period and generate an operation clock signal during a normal operation period. When the switching regulator operates during the clock determination period in a discontinuous conduction mode, the control circuit alternatingly generates plural PWM signals corresponding to the test clock signals generated by the operation clock signal generator circuit and an output voltage, wherein each PWM signal corresponds to one test clock signal, so that the power stage circuit generates corresponding phase node voltages at a phase node, wherein among the plural test clock signals, the operation clock signal generator circuit selects one test clock signal corresponding to a minimum phase node voltage as the operation clock signal during the normal operation period.

19 Claims, 10 Drawing Sheets

SWITCHING REGULATOR AND OPERATION CLOCK SIGNAL GENERATOR CIRCUIT AND CONTROL METHOD THEREOF

CROSS REFERENCE

The present invention claims priority to TW 111139087 filed on Oct. 14, 2022.

BACKGROUND OF THE INVENTION

Field of Invention

The present invention relates to a switching regulator and an operation clock signal generator circuit and a control method thereof; particularly, it relates to such switching regulator capable of operating substantially in constant frequency and having an improved light load efficiency, and an operation clock signal generator circuit and a control method thereof.

Description of Related Art

Figure 1:
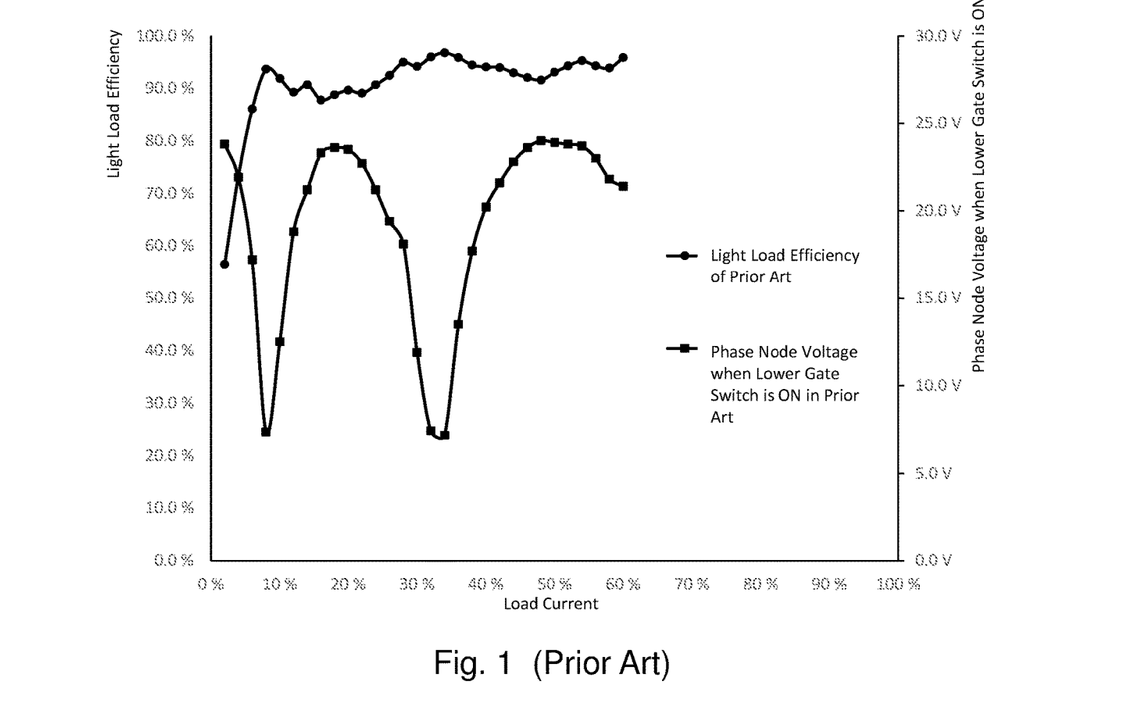
FIG. 1 is a diagram showing the light load efficiency and phase node voltage when the lower gate switch is ON in a conventional switching regulator.

FIG. 1 is a diagram showing the light load efficiency and phase node voltage when the lower gate switch is ON in a conventional switching regulator. As shown in FIG. 1, because this conventional switching regulator adopts a single constant switching frequency and because this conventional switching regulator is unable to achieve zero voltage switching (ZVS), the phase node voltage when the lower gate switch is ON is sometimes low (e.g., at a valley) and is sometimes high (e.g., at a peak). As a result, the prior art shown in FIG. 1 has an unstable light load efficiency; the light load efficiency is better only when the phase node voltage is close to the valley.

In another prior art, the time point when the lower gate switch is turned ON is adjusted by taking zero voltage switching into consideration, so as to control the time point when the lower gate switch is turned ON to be at a time point when the phase node voltage of the lower gate switch is zero to achieve zero voltage switching, thereby improving the power conversion efficiency. Nevertheless, this involves adjusting operation frequency and the operation frequency may be beyond a range acceptable by a load circuit which is required to operate in constant frequency. That is, when a load circuit is required to operate in a specific range (e.g., an LED driver which is applied in a touch screen with a stylus), zero voltage switching cannot be smoothly achieved. A relevant prior art is U.S. Pat. No. 8,629,660B2.

In view of the above, to overcome the drawbacks in the prior art, the present invention proposes a switching regulator which is capable of operating substantially in constant frequency and having an improved light load efficiency, and an operation clock signal generator circuit and a control method thereof.

SUMMARY OF THE INVENTION

From one perspective, the present invention provides a switching regulator, comprising: a power stage circuit, which is configured to operably switch at least one power switch therein according to one of a plurality pulse width modulation (PWM) signal during a normal operation period, so as to convert an input voltage to an output voltage; a control circuit, which is configured to operably generate the PWM signal according to the output voltage and an operation clock signal during the normal operation period; and an operation clock signal generator circuit, which is configured to operably generate a plurality of test clock signals during a clock determination period and generate the operation clock signal during the normal operation period, wherein the plurality of test clock signals correspond to the plurality of PWM signals, respectively; wherein the operation clock signal generator circuit includes: a clock signal determination unit, which is configured to operably generate a clock determination signal according to a plurality of phase node voltages corresponding to the plurality of test clock signals and according to a plurality of PWM signals corresponding to the plurality of test clock signals during the clock determination period; and a clock signal generation unit, which is configured to operably generate the plurality of test clock signals in accordance with a basic clock signal and a tolerable frequency range during the clock determination period, and is configured to operably generate the operation clock signal according to the clock determination signal during the normal operation period; wherein when the switching regulator operates during the clock determination period in a discontinuous conduction mode (DCM), the control circuit alternatingly generates a plurality of PWM signals according to the plurality of test clock signals generated by the operation clock signal generator circuit and the output voltage, each PWM signal corresponding to one of the test clock signals, so that the power stage circuit generates corresponding phase node voltages at a phase node; wherein among the plurality of test clock signals, the operation clock signal generator circuit selects one test clock signal corresponding to a minimum phase node voltage as the operation clock signal during the normal operation period.

From another perspective, the present invention provides an operation clock signal generator circuit for use in a switching regulator, wherein the switching regulator includes: a power stage circuit and a control circuit, wherein the power stage circuit is configured to operably convert an input voltage to an output voltage; the operation clock signal generator circuit comprising: a clock signal determination unit, which is configured to operably generate a clock determination signal according to a plurality of phase node voltages corresponding to the plurality of test clock signals and according to a plurality of PWM signals corresponding to the plurality of test clock signals during the clock determination period; and a clock signal generation unit, which is configured to operably generate the plurality of test clock signals in accordance with a basic clock signal and a tolerable frequency range during the clock determination period, and is configured to operably generate the operation clock signal according to the clock determination signal during the normal operation period; herein when the switching regulator operates during the clock determination period in a discontinuous conduction mode (DCM), the control circuit alternatingly generates a plurality of PWM signals according to the plurality of test clock signals generated by the operation clock signal generator circuit and the output voltage, each PWM signal corresponding to one of the test clock signals, so that the power stage circuit generates corresponding phase node voltages at a phase node; wherein among the plurality of test clock signals, the operation clock signal generator circuit selects one test clock signal corresponding to a minimum phase node voltage as the operation clock signal during the normal operation period.

In one embodiment, the clock signal determination unit includes: a sample-and-hold circuit, which is configured to operably sample and hold a readout value of each phase node voltage when the PWM signal corresponding to the phase node voltage is switched to an enable level according to a clock option signal during the clock determination period, so as to generate a plurality of the sample-and-hold values, each sample-and-hold value corresponding to one readout value of each phase node voltage; a comparison circuit, which is configured to operably compare the plurality of sample-and-hold values during the clock determination period, to generate a plurality of comparison results; and a minimum selection circuit, which is configured to operably judge the plurality of comparison results to generate the clock determination signal during the clock determination period, wherein the clock determination signal is indicative of the test clock signal corresponding to the minimum phase node voltage.

In one embodiment, the clock signal generation unit includes: a logic circuit, which is configured to operably generate a selection signal according to the clock determination signal during the normal operation period and generate the clock option signal during the clock determination period; a plurality of counter circuits, which are configured to operably generate the plurality of test clock signals according to the basic clock signal and the tolerable frequency range; and a multiplexer circuit, which is configured to operably generate the operation clock signal according to the selection signal during the normal operation period and select one of the plurality of test clock signals according to the clock option signal during the clock determination period.

In one embodiment, the logic circuit includes a finite state machine (FSM).

In one embodiment, the power stage circuit includes: a buck power stage circuit, a boost power stage circuit, a buck-boost power stage circuit or a flyback power stage circuit.

In one embodiment, the power stage circuit is the boost power stage circuit.

In one embodiment, frequencies of the plurality of test clock signals are different from one another, and wherein the frequencies of the plurality of test clock signals are within the tolerable frequency range.

From yet another perspective, the present invention provides a control method configured to operably control a switching regulator, to convert an input voltage to an output voltage; the control method comprising: generating a plurality of test clock signals in accordance with a basic clock signal and a tolerable frequency range during a clock determination period; alternatingly generating a plurality of (PWM) signals according to the plurality of test clock signals and the output voltage, each PWM signal corresponding to one of the test clock signals, so as to generate corresponding phase node voltages at a phase node; during the clock determination period, generating a clock determination signal according to the plurality of phase node voltages corresponding to the plurality of test clock signals and the plurality of PWM signals corresponding to the plurality of test clock signals; among the plurality of test clock signals, selecting one test clock signal corresponding to a minimum phase node voltage as an operation clock signal during a normal operation period; and generating the operation clock signal according to the clock determination signal during the normal operation period.

In one embodiment, the step for generating a clock determination signal according to the plurality of phase node voltages corresponding to the plurality of test clock signals and according to the plurality of PWM signals corresponding to the plurality of test clock signals includes: during the clock determination period, sampling and holding a readout value of each phase node voltage when the PWM signal corresponding to the phase node voltage is switched to an enable level according to a clock option signal during the clock determination period, so as to generate a plurality of the sample-and-hold values, each sample-and-hold value corresponding to one readout value of each phase node voltage; during the clock determination period, comparing the plurality of sample-and-hold values, to generate a plurality of comparison results; during the clock determination period, judging the plurality of comparison results, to generate the clock determination signal, wherein the clock determination signal is indicative of the test clock signal corresponding to the minimum phase node voltage.

In one embodiment, the step for generating the operation clock signal according to the clock determination signal during the normal operation period includes: generating a selection signal according to the clock determination signal during the normal operation period; and during the normal operation period, generating the operation clock signal according to the selection signal.

Advantages of the present invention include: that the present invention can operate substantially in constant frequency to a certain degree, and that the present invention has an improved light load efficiency.

The objectives, technical details, features, and effects of the present invention will be better understood with regard to the detailed description of the embodiments below, with reference to the attached drawings.

BRIEF DESCRIPTION OF THE DRAWINGS

FIG. 3A to FIG. 3K show different types of power stage circuits that the present invention can be applied to.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention.

Figure 2A:
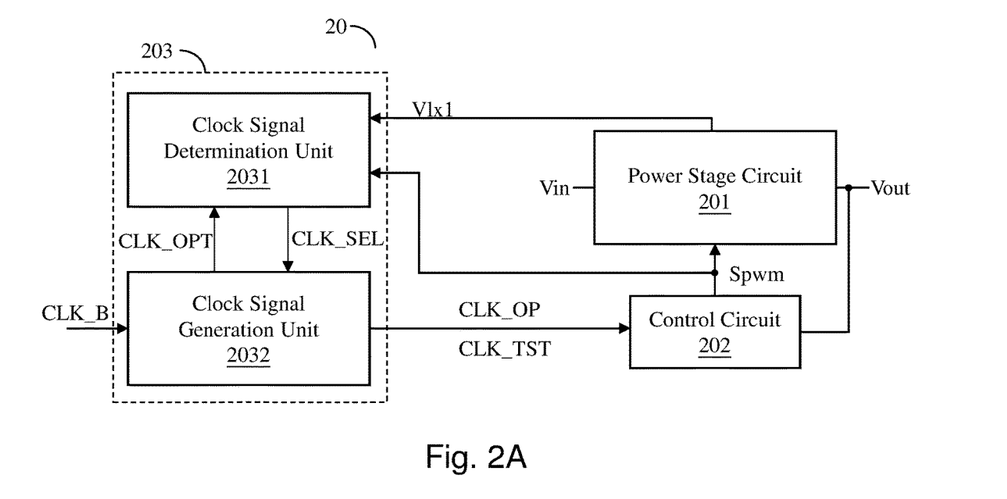
FIG. 2A shows a schematic circuit block diagram of a switching regulator according to an embodiment of the present invention.

Please refer to FIG. 2A, which shows a schematic circuit block diagram of a switching regulator according to an embodiment of the present invention. As shown in FIG. 2A, the switching regulator 20 of the present invention includes: a power stage circuit 201, a control circuit 202 and an operation clock signal generator circuit 203. The power stage circuit 201 is configured to operably switch at least one power switch therein according to a pulse width modulation (PWM) signal Spwm during a normal operation period, so as to convert an input voltage Vin to an output voltage Vout. In one embodiment, the aforementioned output voltage Vout is provided to a load circuit which requires a constant frequency, wherein such load circuit can be, for example but not limited to, a touch screen with a stylus. The control circuit 202 is configured to operably generate the PWM signal Spwm according to the output voltage Vout and an operation clock signal CLK_OP during the normal operation period. The operation clock signal generator circuit 203 is configured to operably generate test clock signals CLK_TST during a clock determination period and generate the operation clock signal CLK_OP during the normal operation period.

As shown in FIG. 2A, the operation clock signal generator circuit 203 includes: a clock signal determination unit 2031 and a clock signal generation unit 2032. The clock signal determination unit 2031 is configured to operably generate a clock determination signal CLK_SEL according to phase node voltages Vlx1 corresponding to the test clock signals CLK_TST and according to PWM signals Spwm corresponding to the test clock signals CLK_TST during the clock determination period. The clock signal generation unit 2032 is configured to operably generate the test clock signals CLK_TST in accordance with a basic clock signal CLK_B and a tolerable frequency range during the clock determination period, and the clock signal generation unit 2032 is configured to operably generate the operation clock signal CLK_OP according to the clock determination signal CLK_SEL during the normal operation period, so that the control circuit 202 can generate the PWM signal Spwm according to the operation clock signal CLK_OP, to switch the aforementioned at least one power switch to thereby converting the input voltage Vin to the output voltage Vout. In one embodiment, the frequencies of the test clock signals CLK_TST are different from one another, but the frequencies of these test clock signals CLK_TST are all within the tolerable frequency range.

When the switching regulator 20 operates during the clock determination period in a discontinuous conduction mode (DCM), the control circuit 202 alternatingly generates plural PWM signal Spwm according to the test clock signals CLK_TST generated by the operation clock signal generator circuit 203 and the output voltage Vout, wherein each PWM signal Spwm corresponds to one of the test clock signals CLK_TST, so that the power stage circuit 201 generates corresponding phase node voltages Vlx1 at a phase node LX1. Among the test clock signals CLK_TST, the operation clock signal generator circuit 203 selects one test clock signal CLK_TST corresponding to a minimum phase node voltage Vlx1 as the operation clock signal CLK_OP during the normal operation period.

Figure 2B:
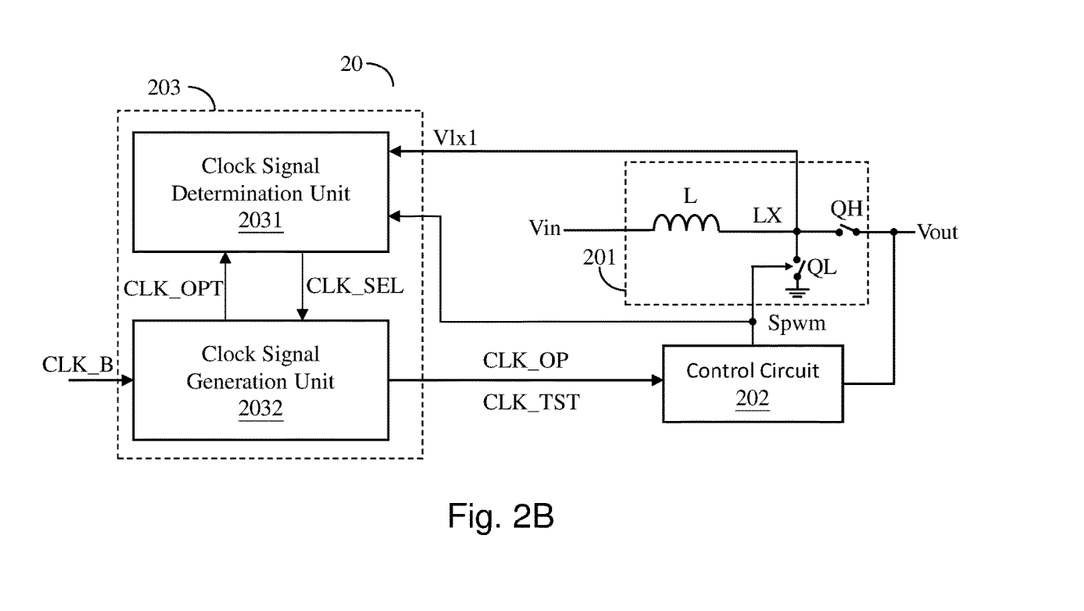
FIG. 2B shows a schematic circuit block diagram of a switching regulator according to another embodiment of the present invention.

FIG. 2B shows a schematic circuit block diagram of a switching regulator according to another embodiment of the present invention. The switching regulator of this embodiment shown in FIG. 2B is similar to the switching regulator of the embodiment shown in FIG. 2A, but is different in that: the power stage circuit 201 of this embodiment is a boost power stage circuit. As shown in FIG. 2B, in one embodiment, the power stage circuit 201 includes: an inductor L and at least one power switch. The at least one power switch includes an upper gate switch QH and a lower gate switch QL. The upper gate switch QH is coupled between the output voltage Vout and a phase node LX, whereas, the lower gate switch QL is coupled between phase node LX and a ground potential. The inductor L has one end coupled to the input voltage Vin and has another end coupled to the phase node LX. In one embodiment, the upper gate switch QH can be replaced by an upper gate diode. In one embodiment, the lower gate switch QL can be replaced by a lower gate diode.

Figure 2C:
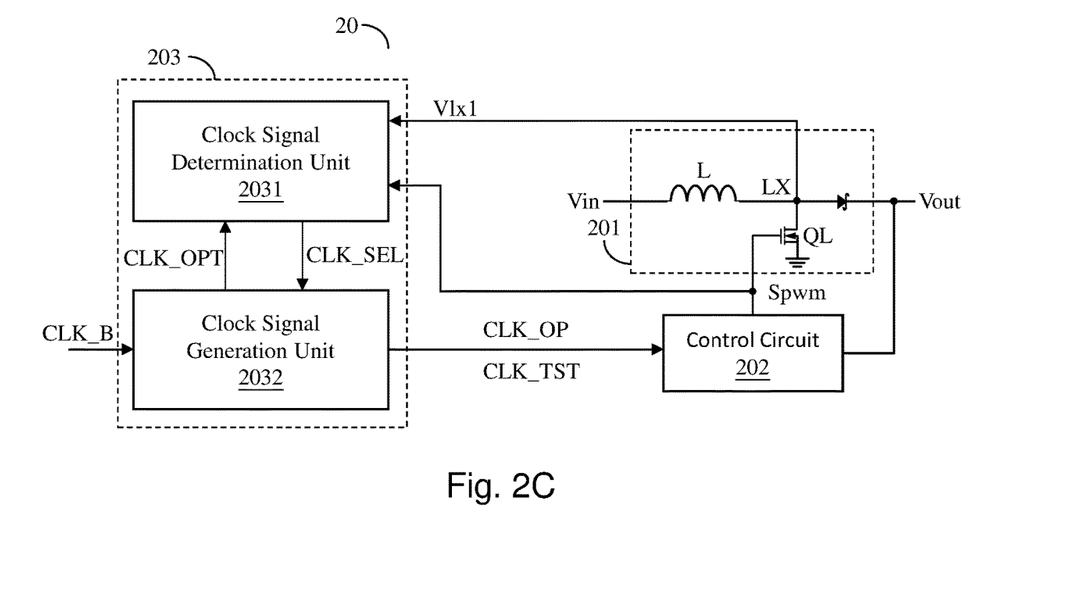
FIG. 2C shows a schematic circuit block diagram of a switching regulator according to yet another embodiment of the present invention.
Figure 3A:
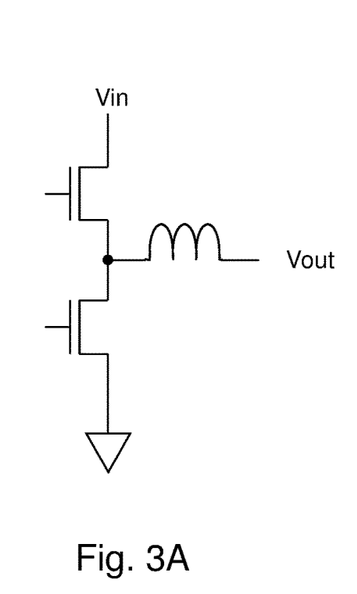
Figures 3B, 3C:
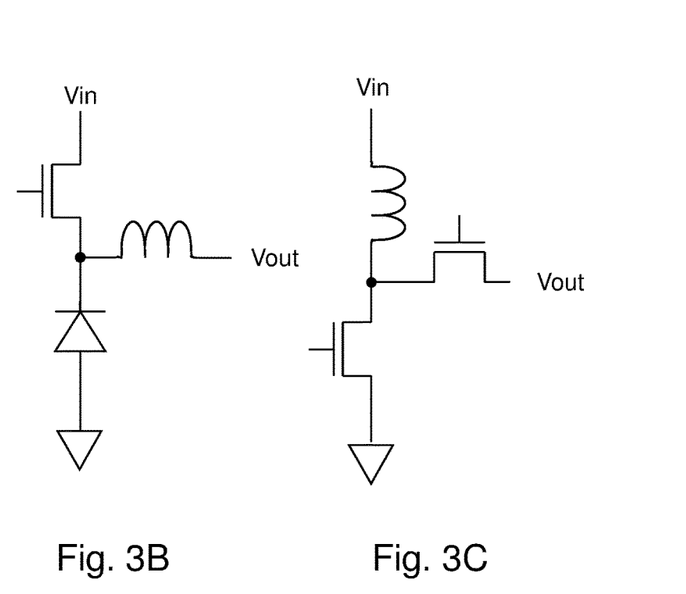
Figure 3D:
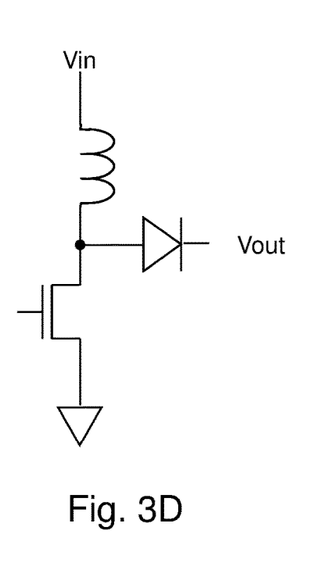
Figure 3E:
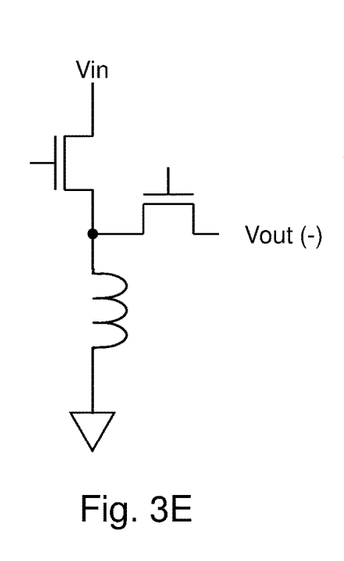
Figure 3F:
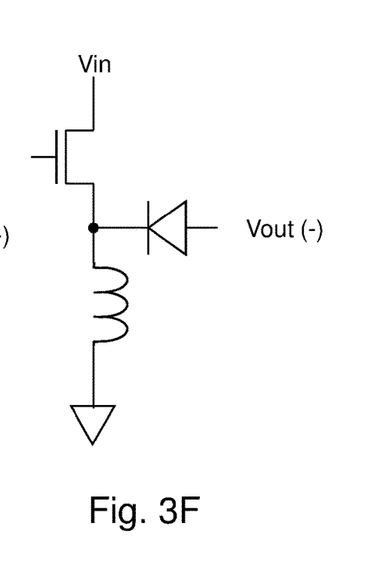
Figure 3G:
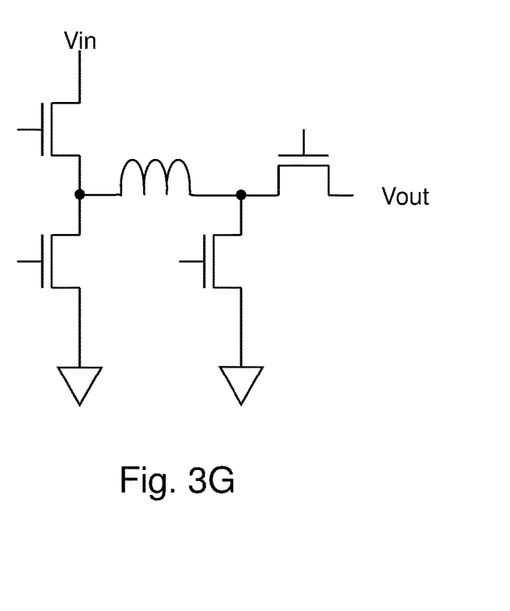
Figure 3H:
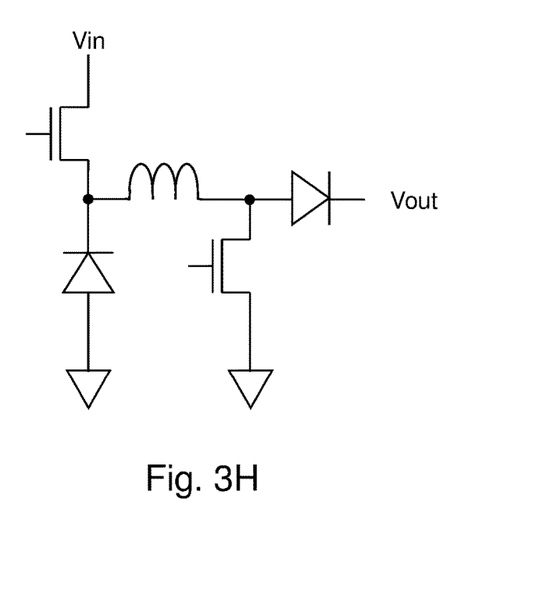
Figure 3I:
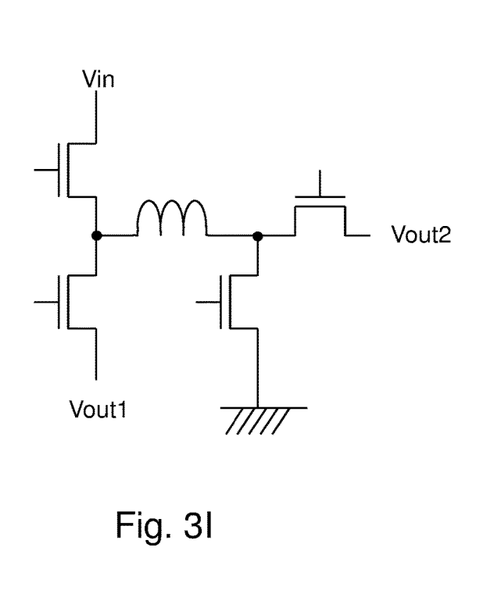
Figure 3J:
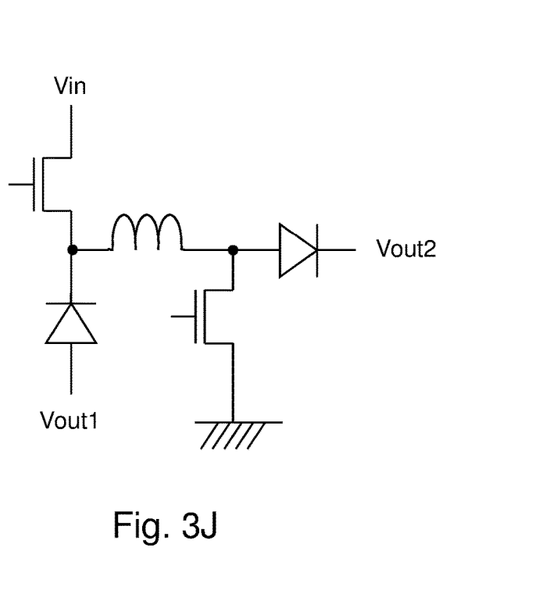
Figure 3K:
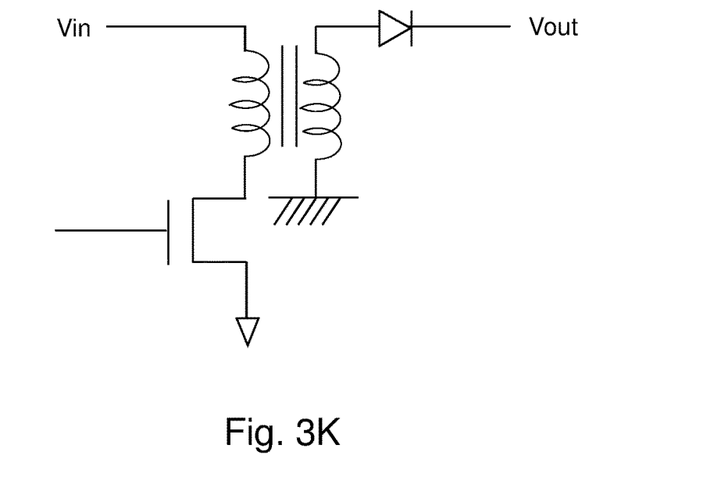

FIG. 2C shows a schematic circuit block diagram of a switching regulator according to yet another embodiment of the present invention. The switching regulator of this embodiment shown in FIG. 2C is similar to the switching regulator of the embodiment shown in FIG. 2B, but is different in that: the upper gate switch of this embodiment is a Schottky diode, whereas, the lower gate switch QL is a Metal-Oxide-Semiconductor Field-Effect Transistor (MOSFET).

FIG. 3A to FIG. 3K show that the present invention is applicable to different types of switching regulators. The power stage circuit 201 of FIG. 2A can be implemented as any one of power stage circuit topologies shown in FIG. 3A to FIG. 3K, wherein FIG. 3A to FIG. 3K show synchronous and asynchronous buck, boost, buck-boost, inverting buck-boost and flyback power stage circuits, respectively.

Figure 4:
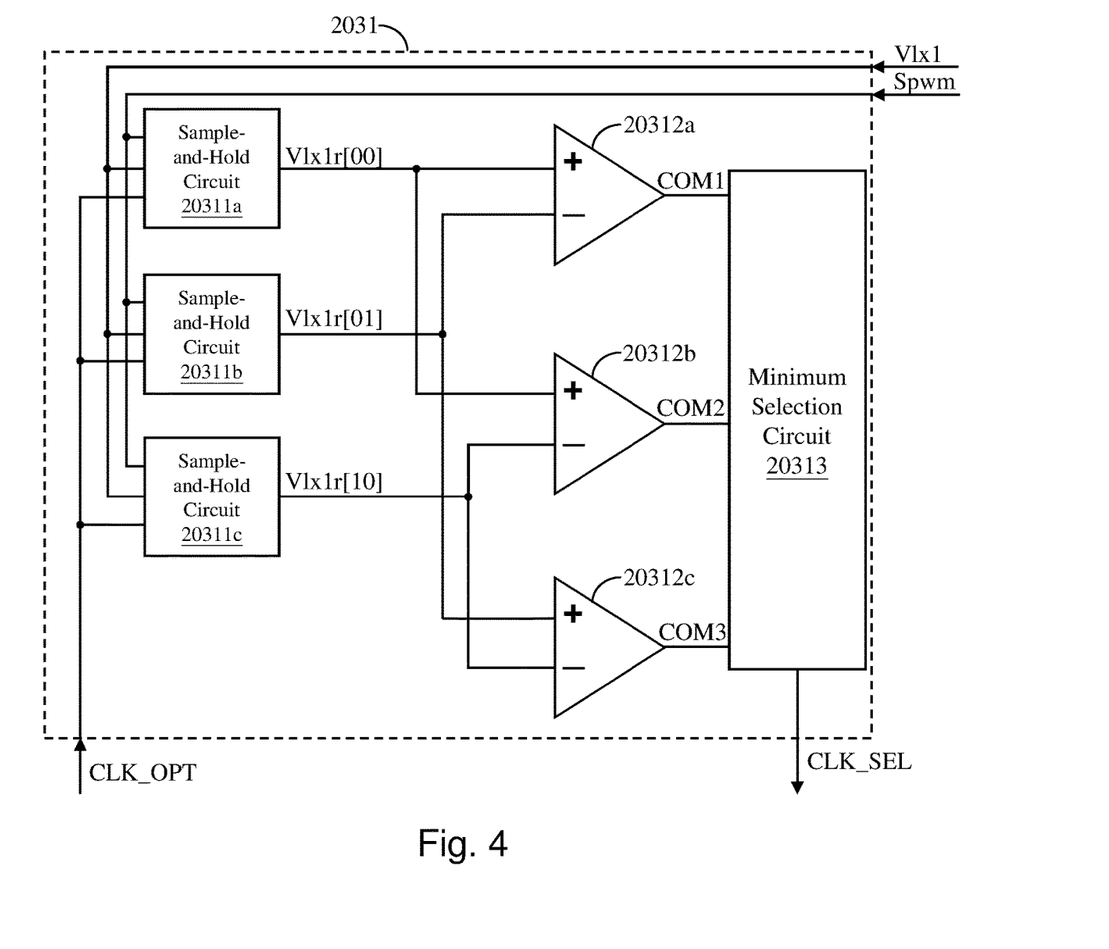
FIG. 4 shows a schematic circuit block diagram of a clock signal determination unit in a switching regulator according to an embodiment of the present invention.

FIG. 4 shows a schematic circuit block diagram of a clock signal determination unit in a switching regulator according to an embodiment of the present invention. As shown in FIG. 4, the clock signal determination unit 2031 includes: sample-and-hold circuits 20311a, 20311b and 20311c, comparison circuits 20312a, 20312b and 20312c and a minimum selection circuits 20313. According to a clock option signal CLK_OPT (which includes clock option signals CLK_OPT[0:0], CLK_OPT[0:1] and CLK_OPT[1:0] corresponding to the test clock signals CLK_TST1, CLK_TST2 and CLK_TST3), during the clock determination period, each of the sample-and-hold circuits 20311a, 20311b and 20311c is configured to operably sample and hold a readout value of the phase node voltage Vlx1 corresponding to one of the test clock signals CLK_TST1, CLK_TST2 and CLK_TST3 when the corresponding PWM signal Spwm is switched to an enable level, so as to obtain the phase node voltage Vlx1 at a time point when the power switch is ON to generate, as a whole, corresponding sample-and-hold values Vlx1r[00], Vlx1r[01] and Vlx1r[10].

The comparison circuits 20312a, 20312b and 20312c are configured to operably compare the sample-and-hold values Vlx1r[00], Vlx1r[01] and Vlx1r[10] during the clock determination period, to generate comparison results COM1, COM2 and COM3. The minimum selection circuit 20313 is configured to operably judge the comparison results COM1, COM2 and COM3 during the clock determination period, to generate the clock determination signal CLK_SEL, wherein the clock determination signal CLK_SEL is indicative of the test clock signal CLK_TST corresponding to the minimum phase node voltage Vlx1. Thus, while a switching frequency is being remained within the tolerable frequency range, the phase node voltage Vlx1 generated when the PWM signal Spwm is switched to an enable level is controlled to be as low as possible, so that the light load efficiency is better.

Figure 5:
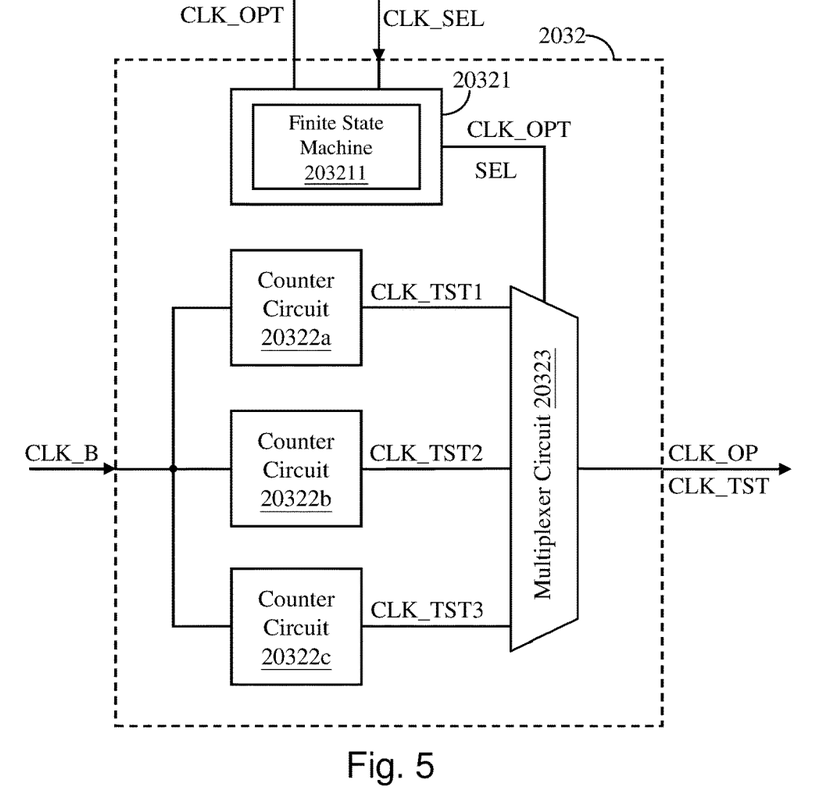
FIG. 5 shows a schematic circuit block diagram of a clock signal generation unit in a switching regulator according to an embodiment of the present invention.

FIG. 5 shows a schematic circuit block diagram of a clock signal generation unit in a switching regulator according to an embodiment of the present invention. As shown in FIG. 5, the clock signal generation unit 2032 includes: a logic circuit 20321, counter circuits 20322a, 20322b and 20322c and a multiplexer circuit 20323. The logic circuit 20321 is configured to operably generate a selection signal SEL according to the clock determination signal CLK_SEL during the normal operation period and generate the clock option signal CLK_OPT (i.e., generating clock option signal CLK_OPT[0:0], CLK_OPT[0:1] and CLK_OPT[1:0] alternatingly) during the clock determination period. The counter circuits 20322a, 20322b and 20322c are configured to operably generate the test clock signals CLK_TST1, CLK_TST2 and CLK_TST3 according to the basic clock signal CLK_B and the tolerable frequency range. In one embodiment, frequencies of the test clock signals CLK_TST1, CLK_TST2 and CLK_TST3 are different from one another, and the frequencies of the test clock signals CLK_TST1, CLK_TST2 and CLK_TST3 are all within the tolerable frequency range.

For example, the basic clock signal CLK_B is a 16 MHz clock signal. The test clock signal CLK_TST1 has a frequency wherein each pulse of the test clock signal CLK_TST1 is generated by counting 12 pulses of the basic clock signal CLK_B, that is, the test clock signal CLK_TST1 has a period of 750 nanoseconds and a frequency of 1.333 MHz. Similarly, the test clock signal CLK_TST2 has a frequency wherein each pulse of the test clock signal CLK_TST2 is generated by counting 13 pulses of the basic clock signal CLK_B, that is, the test clock signal CLK_TST2 has a period of 812.5 nanoseconds and a frequency of 1.23 MHz. Similarly, the test clock signal CLK_TST3 has a frequency wherein each pulse of the test clock signal CLK_TST3 is generated by counting 14 pulses of the basic clock signal CLK_B, that is, the test clock signal CLK_TST3 has a period of 875 nanoseconds and a frequency of 1.143 MHz.

In one embodiment, the multiplexer circuit 20323 is configured to operably generate the operation clock signal CLK_OP according to the selection signal SEL (e.g., one of the selection signals SEL[0:0], SEL[0:1] and SEL[1:0]) during the normal operation period and select the test clock signal CLK_TST (e.g., one of the test clock signals CLK_TST1, CLK_TST2 and CLK_TST3) according to the clock option signal CLK_OPT (e.g., one of the clock option signals CLK_OPT[0:0], CLK_OPT[0:1] and CLK_OPT[1:0]) during the clock determination period. In one embodiment, the logic circuit 20321 includes a finite state machine (FSM).

For example, during the clock determination period, the sample-and-hold value Vlx1r[00] corresponds to a phase node voltage generated according to the test clock signal CLK_TST1 (which is for example a clock signal having a 1.333 MHz frequency). The sample-and-hold value Vlx1r[01] corresponds to a phase node voltage generated according to the test clock signal CLK_TST2 (which is for example a clock signal having a 1.23 MHz frequency). The sample-and-hold value Vlx1r[10] corresponds to a phase node voltage generated according to the test clock signal CLK_TST3 (which is for example a clock signal having a 1.143 MHz frequency). As described above, the comparison circuits 20312a, 20312b and 20312c are configured to operably compare the sample-and-hold values Vlx1r[00], Vlx1r[01] and Vlx1r[10] during the clock determination period, to generate comparison results COM1, COM2 and COM3. As exemplified by the embodiment of FIG. 4, when the comparison result COM1 is at high level, it indicates that the sample-and-hold value Vlx1r[00] is greater than the sample-and-hold value Vlx1r[01]; when the comparison result COM2 is at high level, it indicates that the sample-and-hold value Vlx1r[00] is greater than the sample-and-hold value Vlx1r[10]; when the comparison result COM3 is at high level, it indicates that the sample-and-hold value Vlx1r[01] is greater than the sample-and-hold value Vlx1r[10]. For example, when comparison results COM1, COM2 and COM3 are all at high level, it indicates that the sample-and-hold value Vlx1r[10] is a minimum of the sample-and-hold values. The minimum selection circuit 20313 judges that the sample-and-hold value Vlx1r[10] is the minimum, and generates the clock determination signal CLK_SEL[1:0] accordingly, wherein the clock determination signal CLK_SEL[1:0] indicates that the phase node voltage Vlx1 generated according to the test clock signal CLK_TST3 (which is for example a clock signal having a 1.143 MHz frequency) is the minimum phase node voltage. The clock signal generation unit 2032 selects the test clock signal CLK_TST3 as the operation clock signal CLK_OP during the normal operation period according to the clock determination signal CLK_SEL[1:0], and the operation clock signal CLK_OP is provided to the control circuit 202, for generating the PWM signal Spwm by the control circuit 202. The logic circuit 20321 generates a selection signal SEL[1:0] according to the clock determination signal CLK_SEL[1:0] during the normal operation period. In this case, the multiplexer circuit 20323 selects the test clock signal CLK_TST3 as the operation clock signal CLK_OP according to the selection signal SEL[1:0].

It is worthwhile noting that, it is not necessary for the comparison circuit to be implemented as the comparison circuits 20312a, 20312b and 20312c and the comparison mechanisms among the comparison circuits 20312a, 20312b and 20312c; the above-mentioned embodiment is only an illustrative example, but not for limiting the broadest scope of the present invention. In other embodiments, it is also practicable and within the broadest scope of the present invention that the comparison circuit can be implemented in other ways, as long as the minimum selection circuit 20313 can determine a minimum sample-and-hold value among the plural sample-and-hold values according to a comparison result of the comparison circuit.

Figure 6:
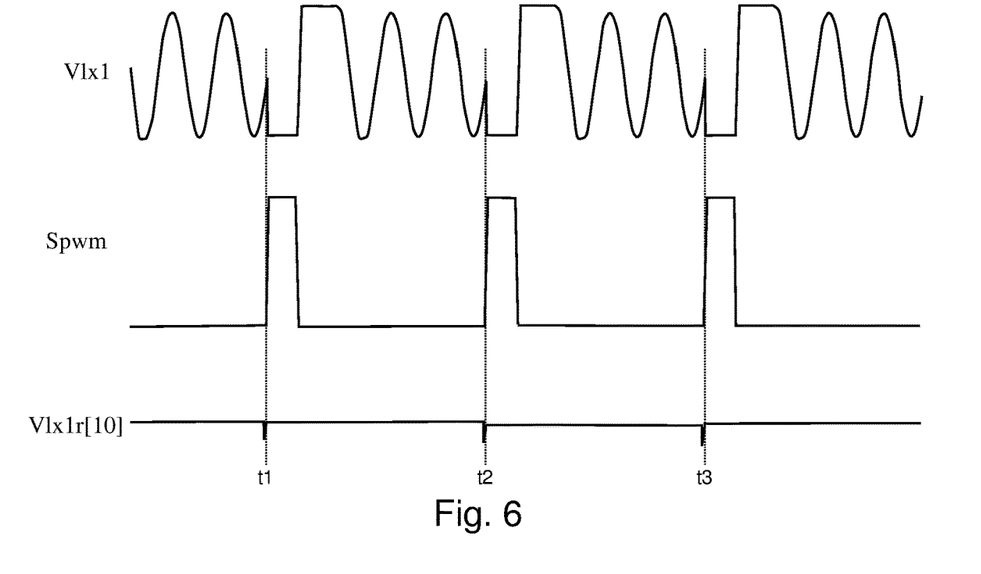
FIG. 6 illustrates a signal waveform diagram depicting relevant signals within a clock signal determination unit in a switching regulator according to an embodiment of the present invention.

FIG. 6 illustrates a signal waveform diagram depicting relevant signals within a clock signal determination unit in a switching regulator according to an embodiment of the present invention. Following the aforementioned example, during the clock determination period, the phase node voltage Vlx1 generated according to the test clock signal CLK_TST3, the PWM signal Spwm, and the sample-and-hold value Vlx1r[10] are shown in FIG. 6. Please refer to FIG. 6 along with FIG. 4. When the PWM signal Spwm is switched to an enable level at time point t1, time point t2 and time point t3, taking the clock option signal CLK_OPT[1:0]

as an example, the sample-and-hold circuit 20311c samples and holds the phase node voltage Vlx1 to obtain the sample-and-hold value Vlx1r[10].

Figure 7:
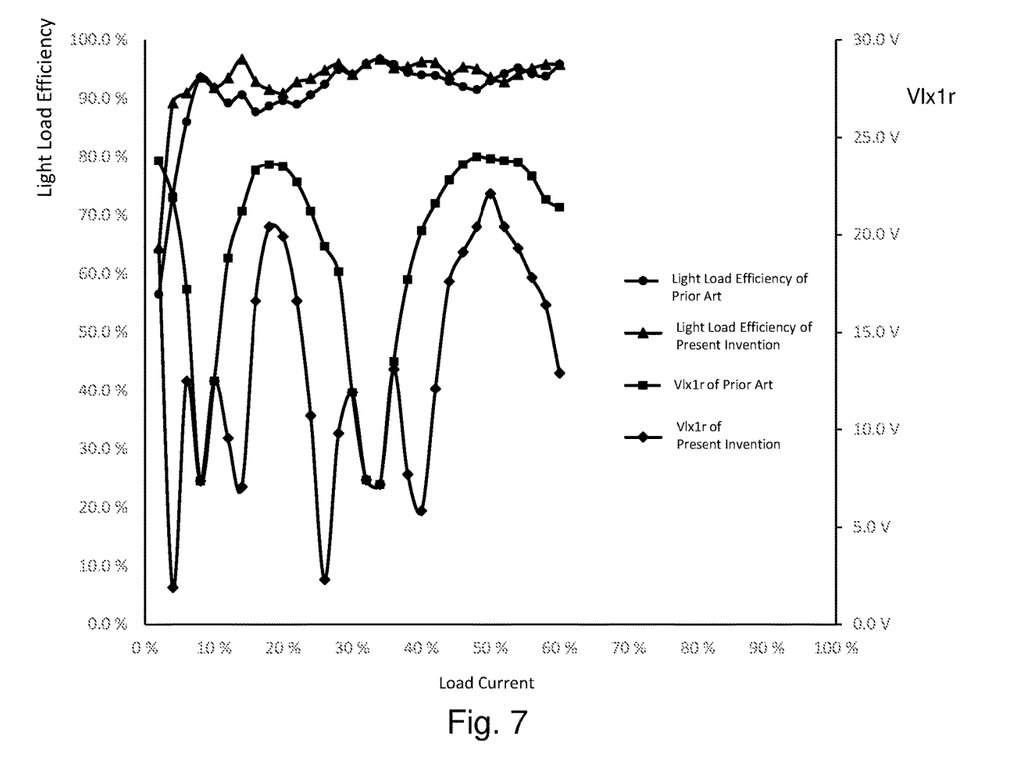
FIG. 7 is a diagram showing the light load efficiency and phase node voltage when the lower gate switch is ON in a conventional switching regulator and the light load efficiency and phase node voltage when the lower gate switch is ON in the present invention.

FIG. 7 is a diagram showing the light load efficiency and phase node voltage when the lower gate switch is ON in a conventional switching regulator and the light load efficiency and phase node voltage when the lower gate switch is ON in the present invention. As shown in FIG. 7, as compared to the prior art, the sample-and-hold value Vlx1r of the phase node voltage Vlx1 obtained by the present invention is lower than that in the prior art, it is obvious that the light load efficiency of the present invention is better than the light load efficiency of the prior art.

Figure 8:
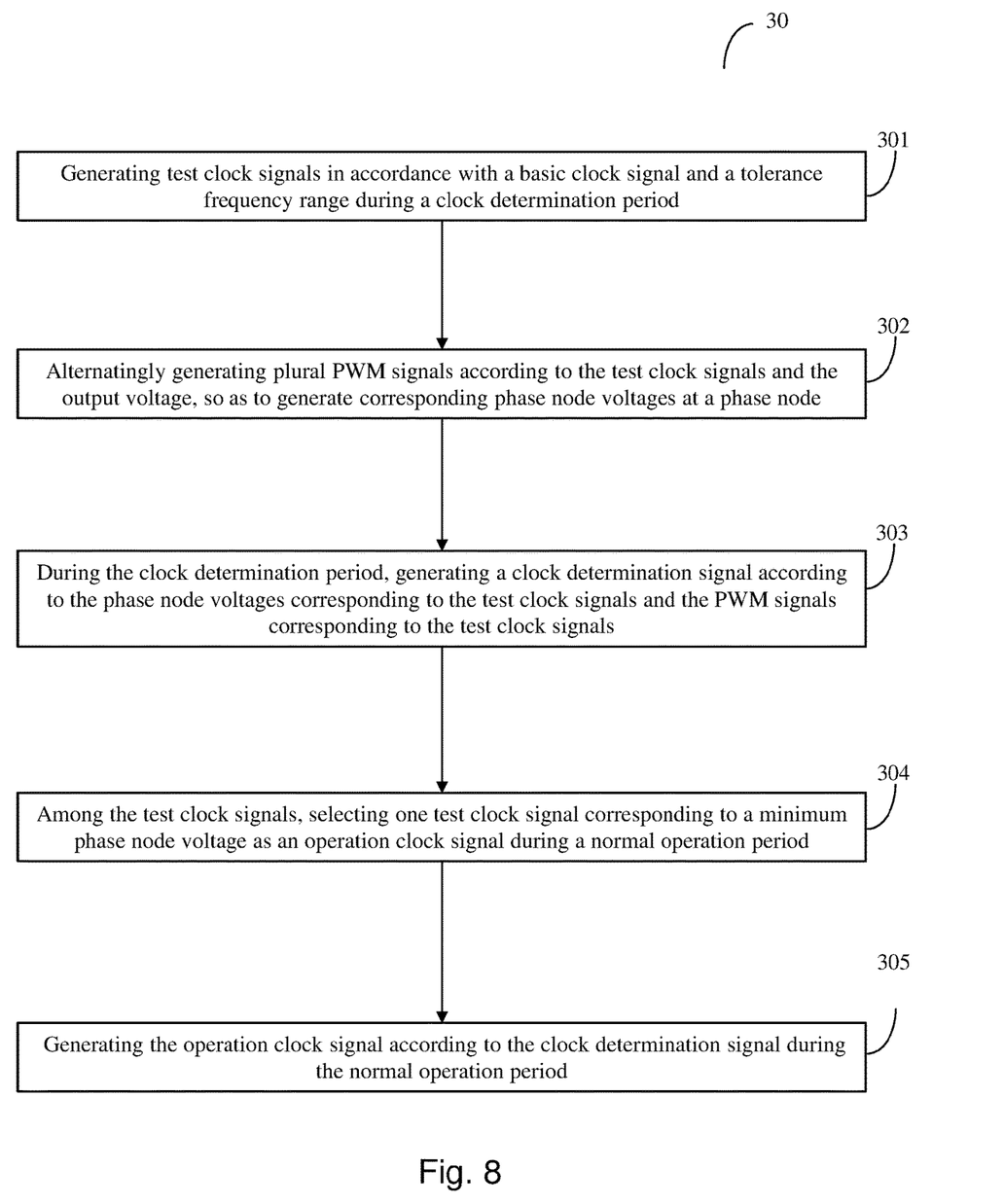
FIG. 8 shows a flow chart diagram of a control method of a switching regulator according to an embodiment of the present invention.

FIG. 8 shows a flow chart diagram of a control method of a switching regulator according to an embodiment of the present invention. The control method 30 of a switching regulator of the present invention includes: first, in step 301, generating test clock signals in accordance with a basic clock signal and a tolerable frequency range during a clock determination period; next in step 302, alternatingly generating plural PWM signals according to the test clock signals and the output voltage, so as to generate corresponding phase node voltages at a phase node; next, in step 303, during the clock determination period, generating a clock determination signal according to the phase node voltages corresponding to the test clock signals and the PWM signals corresponding to the test clock signals; next in step 304, among the test clock signals, selecting a test clock signal corresponding to a minimum phase node voltage as an operation clock signal during a normal operation period; next in step 305, generating the operation clock signal according to the clock determination signal during the normal operation period.

Figure 9:
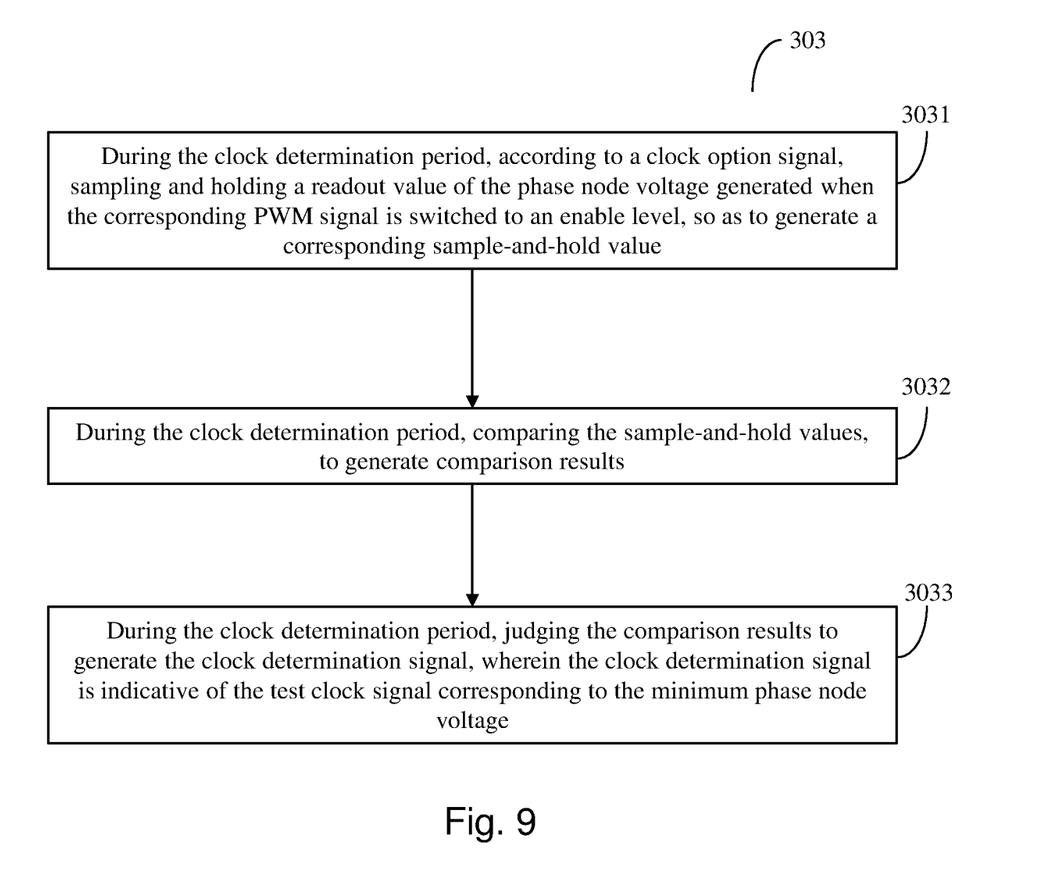
FIG. 9 shows a flow chart diagram of a control method of a switching regulator according to an embodiment of the present invention.

FIG. 9 shows a flow chart diagram of a control method of a switching regulator according to an embodiment of the present invention. In one embodiment, step 303 includes: step 3031, step 3032 and step 3033. In step 3031, during the clock determination period, according to a clock option signal, the method samples and holds a readout value of the phase node voltage generated when the corresponding PWM signal is switched to an enable level, so as to generate a corresponding sample-and-hold value. Next, in step 3032, during the clock determination period, the method compares the sample-and-hold values to generate comparison results. Next, in step 3033, during the clock determination period, the method judges the comparison results to generate the clock determination signal, wherein the clock determination signal is indicative of the test clock signal corresponding to the minimum phase node voltage.

Figure 10:
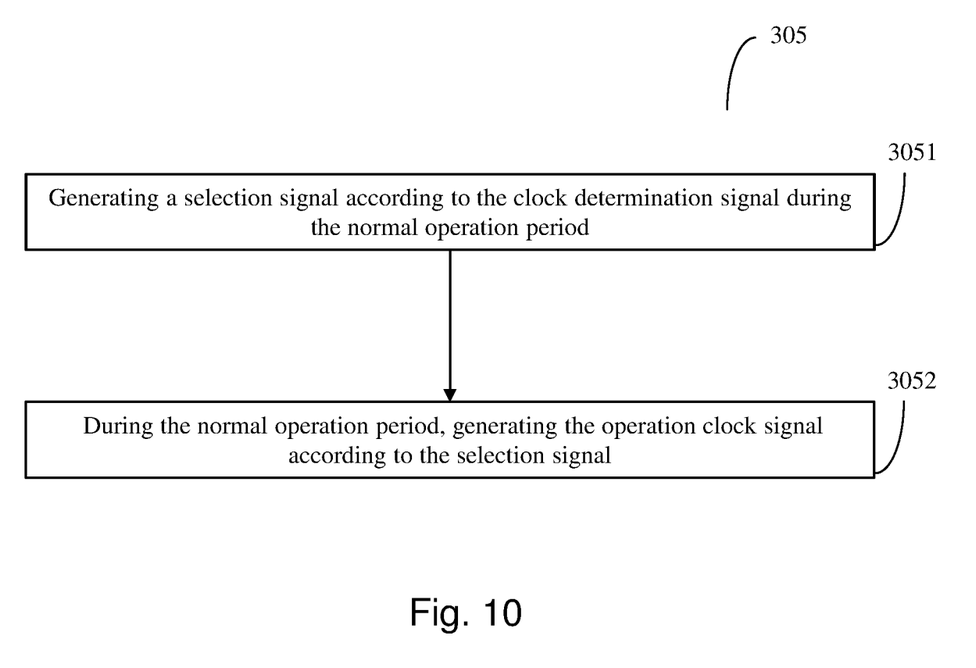
FIG. 10 shows a flow chart diagram of a control method of a switching regulator according to an embodiment of the present invention.

FIG. 10 shows a flow chart diagram of a control method of a switching regulator according to an embodiment of the present invention. In one embodiment, step 305 includes: step 3051 and step 3052. In step 3051, a selection signal is generated according to the clock determination signal during the normal operation period. Next, in step 3052, during the normal operation period, the operation clock signal is generated according to the selection signal.

In light of above, by varying a switching frequency within a tolerable frequency range of a target switching frequency, the present invention can identify a lowest sample-and-hold value Vlx1r corresponding to a phase node voltage Vlx1 generated under different switching frequencies within the tolerable frequency range. Consequently and desirably, the present invention can achieve an optimum light load efficiency within the tolerable frequency range, and maintain a substantially constant frequency to a certain degree.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching regulator, comprising:
 a power stage circuit, which is configured to operably switch at least one power switch therein according to one of a plurality pulse width modulation (PWM) signal during a normal operation period, so as to convert an input voltage to an output voltage;
 a control circuit, which is configured to operably generate the PWM signal according to the output voltage and an operation clock signal during the normal operation period; and
 an operation clock signal generator circuit, which is configured to operably generate a plurality of test clock signals during a clock determination period and generate the operation clock signal during the normal operation period, wherein the plurality of test clock signals correspond to the plurality of PWM signals, respectively; wherein the operation clock signal generator circuit includes:
  a clock signal determination unit, which is configured to operably generate a clock determination signal according to a plurality of phase node voltages corresponding to the plurality of test clock signals and according to the plurality of PWM signals corresponding to the plurality of test clock signals during the clock determination period; and
  a clock signal generation unit, which is configured to operably generate the plurality of test clock signals in accordance with a basic clock signal and a tolerable frequency range during the clock determination period, and is configured to operably generate the operation clock signal according to the clock determination signal during the normal operation period;
 wherein when the switching regulator operates during the clock determination period in a discontinuous conduction mode (DCM), the control circuit alternatingly generates a plurality of PWM signals according to the plurality of test clock signals generated by the operation clock signal generator circuit and the output voltage, each PWM signal corresponding to one of the test clock signals, so that the power stage circuit generates corresponding phase node voltages at a phase node;

wherein among the plurality of test clock signals, the operation clock signal generator circuit selects one test clock signal corresponding to a minimum phase node voltage as the operation clock signal during the normal operation period.

2. The switching regulator of claim 1, wherein the clock signal determination unit includes:
   a sample-and-hold circuit, which is configured to operably sample and hold a readout value of each phase node voltage when the PWM signal corresponding to the phase node voltage is switched to an enable level according to a clock option signal during the clock determination period, so as to generate a plurality of the sample-and-hold values, each sample-and-hold value corresponding to one readout value of each phase node voltage;
   a comparison circuit, which is configured to operably compare the plurality of sample-and-hold values during the clock determination period, to generate a plurality of comparison results; and
   a minimum selection circuit, which is configured to operably judge the plurality of comparison results to generate the clock determination signal during the clock determination period, wherein the clock determination signal is indicative of the test clock signal corresponding to the minimum phase node voltage.

3. The switching regulator of claim 2, wherein the clock signal generation unit includes:
   a logic circuit, which is configured to operably generate a selection signal according to the clock determination signal during the normal operation period and generate the clock option signal during the clock determination period;
   a plurality of counter circuits, which are configured to operably generate the plurality of test clock signals according to the basic clock signal and the tolerable frequency range; and
   a multiplexer circuit, which is configured to operably generate the operation clock signal according to the selection signal during the normal operation period and select one of the plurality of test clock signals according to the clock option signal during the clock determination period.

4. The switching regulator of claim 3, wherein the logic circuit includes a finite state machine (FSM).

5. The switching regulator of claim 1, wherein the power stage circuit includes: a buck power stage circuit, a boost power stage circuit, a buck-boost power stage circuit or a flyback power stage circuit.

6. The switching regulator of claim 5, wherein the power stage circuit is the boost power stage circuit.

7. The switching regulator of claim 1, wherein frequencies of the plurality of test clock signals are different from one another, and wherein the frequencies of the plurality of test clock signals are within the tolerable frequency range.

8. An operation clock signal generator circuit for use in a switching regulator, wherein the switching regulator includes: a power stage circuit and a control circuit, wherein the power stage circuit is configured to operably convert an input voltage to an output voltage; the operation clock signal generator circuit comprising:
   a clock signal determination unit, which is configured to operably generate a clock determination signal according to a plurality of phase node voltages corresponding to the plurality of test clock signals and according to a plurality of pulse width modulation (PWM) signals corresponding to the plurality of test clock signals during the clock determination period; and
   a clock signal generation unit, which is configured to operably generate the plurality of test clock signals in accordance with a basic clock signal and a tolerable frequency range during the clock determination period, and is configured to operably generate the operation clock signal according to the clock determination signal during the normal operation period;
   wherein when the switching regulator operates during the clock determination period in a discontinuous conduction mode (DCM), the control circuit alternatingly generates a plurality of PWM signals according to the plurality of test clock signals generated by the operation clock signal generator circuit and the output voltage, each PWM signal corresponding to one of the test clock signals, so that the power stage circuit generates corresponding phase node voltages at a phase node;
   wherein among the plurality of test clock signals, the operation clock signal generator circuit selects one test clock signal corresponding to a minimum phase node voltage as the operation clock signal during the normal operation period.

9. The operation clock signal generator circuit of claim 8, wherein the clock signal determination unit includes:
   a sample-and-hold circuit, which is configured to operably sample and hold a readout value of each phase node voltage when the PWM signal corresponding to the phase node voltage is switched to an enable level according to a clock option signal during the clock determination period, so as to generate a plurality of the sample-and-hold values, each sample-and-hold value corresponding to one readout value of each phase node voltage;
   a comparison circuit, which is configured to operably compare the plurality of sample-and-hold values during the clock determination period, to generate a plurality of comparison results; and
   a minimum selection circuit, which is configured to operably judge the plurality of comparison results to generate the clock determination signal during the clock determination period, wherein the clock determination signal is indicative of the test clock signal corresponding to the minimum phase node voltage.

10. The operation clock signal generator circuit of claim 9, wherein the clock signal generation unit includes:
    a logic circuit, which is configured to operably generate a selection signal according to the clock determination signal during the normal operation period and generate the clock option signal during the clock determination period;
    a plurality of counter circuits, which are configured to operably generate the plurality of test clock signals according to the basic clock signal and the tolerable frequency range; and
    a multiplexer circuit, which is configured to operably generate the operation clock signal according to the selection signal during the normal operation period and select one of the plurality of test clock signals according to the clock option signal during the clock determination period.

11. The operation clock signal generator circuit of claim 10, wherein the logic circuit includes a finite state machine (FSM).

12. The operation clock signal generator circuit of claim 8, wherein the power stage circuit includes: a buck power stage circuit, a boost power stage circuit, a buck-boost power stage circuit or a flyback power stage circuit.

13. The operation clock signal generator circuit of claim 12, wherein the power stage circuit is the boost power stage circuit.

14. The operation clock signal generator circuit of claim 8, wherein frequencies of the plurality of test clock signals are different from one another, and wherein the frequencies of the plurality of test clock signals are within the tolerable frequency range.

15. A control method configured to operably control a switching regulator, to convert an input voltage to an output voltage; the control method comprising:
    generating a plurality of test clock signals in accordance with a basic clock signal and a tolerable frequency range during a clock determination period;
    alternatingly generating a plurality of (PWM) signals according to the plurality of test clock signals and the output voltage, each PWM signal corresponding to one of the test clock signals, so as to generate corresponding phase node voltages at a phase node;
    during the clock determination period, generating a clock determination signal according to the plurality of phase node voltages corresponding to the plurality of test clock signals and according to the plurality of PWM signals corresponding to the plurality of test clock signals;
    among the plurality of test clock signals, selecting one test clock signal corresponding to a minimum phase node voltage as an operation clock signal during a normal operation period; and
    generating the operation clock signal according to the clock determination signal during the normal operation period.

16. The control method of claim 15, wherein the step for generating a clock determination signal according to the plurality of phase node voltages corresponding to the plurality of test clock signals and according to the plurality of PWM signals corresponding to the plurality of test clock signals includes:
    during the clock determination period, sampling and holding a readout value of each phase node voltage when the PWM signal corresponding to the phase node voltage is switched to an enable level according to a clock option signal during the clock determination period, so as to generate a plurality of the sample-and-hold values, each sample-and-hold value corresponding to one readout value of each phase node voltage;
    during the clock determination period, comparing the plurality of sample-and-hold values, to generate a plurality of comparison results;
    during the clock determination period, judging the plurality of comparison results, to generate the clock determination signal, wherein the clock determination signal is indicative of the test clock signal corresponding to the minimum phase node voltage.

17. The control method of claim 16, wherein the step for generating the operation clock signal according to the clock determination signal during the normal operation period includes:
    generating a selection signal according to the clock determination signal during the normal operation period; and
    during the normal operation period, generating the operation clock signal according to the selection signal.

18. The control method of claim 15, wherein the power stage circuit includes: a buck power stage circuit, a boost power stage circuit, a buck-boost power stage circuit or a flyback power stage circuit.

19. The control method of claim 15, wherein frequencies of the plurality of test clock signals are different from one another, and wherein the frequencies of the plurality of test clock signals are within the tolerable frequency range.

* * * * *